No. 775,367.       Patented November 22, 1904.

UNITED STATES PATENT OFFICE.

MAX KUGEL, OF WIESDORF, NEAR COLOGNE, GERMANY, ASSIGNOR TO FARBENFABRIKEN OF ELBERFELD CO., OF NEW YORK, N. Y., A CORPORATION OF NEW YORK.

GREEN ANTHRACENE DYE.

SPECIFICATION forming part of Letters Patent No. 775,367, dated November 22, 1904.

Application filed July 21, 1904. Serial No. 217,528. (No specimens.)

*To all whom it may concern:*

Be it known that I, MAX KUGEL, doctor of philosophy, chemist, residing at Wiesdorf, near Cologne, Germany, (assignor to the FARBENFABRIKEN OF ELBERFELD CO., of New York,) have invented a new and useful Improvement in New Anthracene Dyes; and I hereby declare the following to be a clear and exact description of my invention.

My invention relates to the manufacture of a new dyestuff, being a hydroazin derivative of the anthracene series.

The new coloring-matter can be obtained by heating the 1-4-diamido-2-3-dibromoanthraquinone with cupric chlorid in the presence of a suitable dissolving or diluting agent, and preferably with the addition of a product having a weak alkaline reaction, such as sodium acetate or the like. The process proceeds most probably according to the following equation:

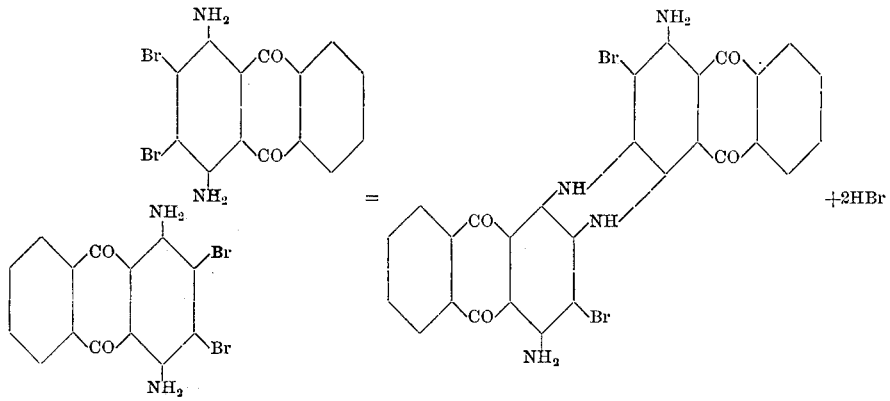

In carrying out the process practically I can proceed as follows, the parts being by weight: A mixture of twenty parts of 1-4-diamido-2-3-dibromoanthraquinone, two hundred parts of nitrobenzene, twelve parts of pulverized anhydrous sodium acetate, and one-half part of cupric chlorid ($CuCl_2$) is heated to boiling for about eight hours while stirring. When the mass has cooled down to 120° centigrade, the needles precipitated during the reaction are filtered off and washed with nitrobenzene, alcohol, and hot water.

The new coloring-matter thus obtained represents bluish-black needles, insoluble in alcohol and soluble in concentrated sulfuric acid with a green color. Upon treatment with hydrosulfite and caustic-soda lye it is transformed into a hydro compound, the alkaline solution of which has the properties of a "vat" suitable for dyeing and printing. This vat dyes unmordanted cotton blue shades, which turn to fast green on exposing the dyed goods to the air or on washing them with water.

Having now described my invention and in what manner the same is to be performed, what I claim as new, and desire to secure by Letters Patent, is—

The herein-described new dyestuff being a hydroazin derivative of the anthracene series, obtainable by heating 1-4-diamido-2-3-dibromoanthraquinone with cupric chlorid and a suitable liquid, which dyestuff represents bluish-black needles insoluble in alcohol and soluble in concentrated sulfuric acid with a green color; being transformed into its hydro compound on suitable reduction with hydrosulfite and caustic-soda lye, the alkaline solution thus obtained exhibiting the typical properties of a "vat" which dyes unmordanted cotton blue turning to a fast green shade on exposing the dyed goods to the air, substantially as hereinbefore described.

In testimony whereof I have signed my name in the presence of two subscribing witnesses.

MAX KUGEL.

Witnesses:
  OTTO KÖNIG,
  HEINR. AHLEFELDER.